United States Patent [19]

Wolfe et al.

[11] 4,041,899

[45] Aug. 16, 1977

[54] RECIPROCATOR DEVICE

[75] Inventors: Eugene Earl Wolfe; Allan Burkett Heath, both of Port Huron, Mich.

[73] Assignee: Acheson Industries, Inc., Port Huron, Mich.

[21] Appl. No.: 694,101

[22] Filed: June 17, 1976

[51] Int. Cl.[2] .......... B05B 3/18; F16H 21/02

[52] U.S. Cl. .......... 118/323; 74/27

[58] Field of Search .......... 118/323, 305, 317, 321, 118/631; 134/174; 425/165, 168; 401/36, 99, 116; 74/27

[56] References Cited

U.S. PATENT DOCUMENTS

| | | | |
|---|---|---|---|
| 3,077,857 | 2/1963 | Widner | 118/323 X |
| 3,120,198 | 2/1964 | Reid | 118/323 X |
| 3,937,092 | 2/1976 | Hawkins | 118/323 X |

*Primary Examiner*—Louis K. Rimrodt

*Attorney, Agent, or Firm*—Harness, Dickey & Pierce

[57] ABSTRACT

There is disclosed herein an improved reciprocating device for use with various forming machinery such as die casting, molding or other like equipment. The reciprocating device is adapted to advance a spray head across the working surfaces of a die, mold or other like forming apparatus when such apparatus is in an open position thereby allowing the spray head to spray these surfaces with a combination of fluids, such as air and/or lubricants, for example. The apparatus employs a spray head having a plurality of nozzles, which is secured to one end of an elongated arm. The opposite end of this elongated arm is removably secured to a carriage assembly which is caused to reciprocate through the co-operation of a threaded rod and drive motor means, thereby alternately extending and withdrawing the elongated arm. Limit switches are provided which are actuated by engagement with portions of the carriage assembly thereby providing means for controlling the flow of fluids to the spray head, the drive motor means and otherwise controlling the operational cycle of the reciprocating device. Additionally, a disc brake means is provided to prevent rotation of the threaded rod when in an on position thereby preventing undesired movement of the carriage assembly, elongated arm, and associated spray head. Various limit switches, timers, valving arrangements, and other control apparatus may be included to provide a wide variety of operational cycles.

28 Claims, 5 Drawing Figures

FIG. 1.
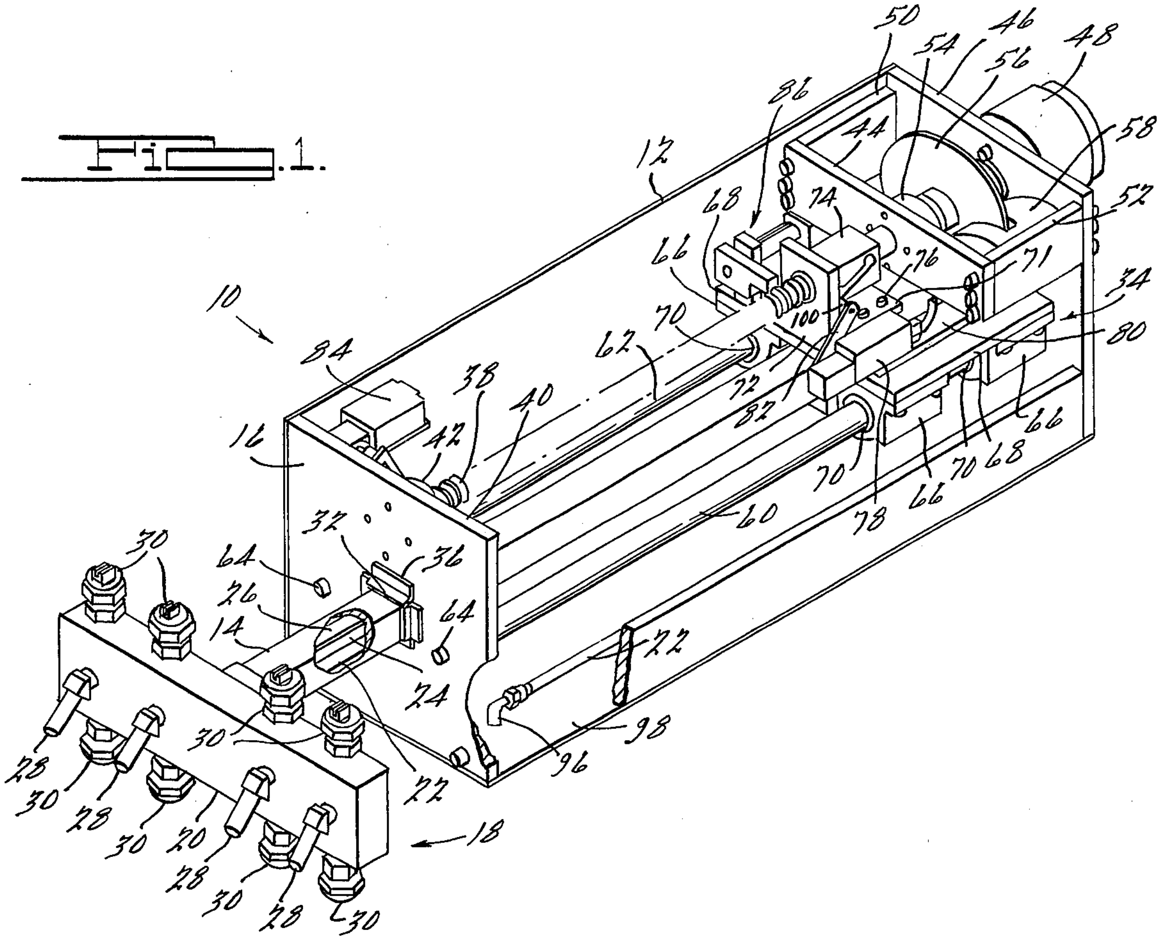
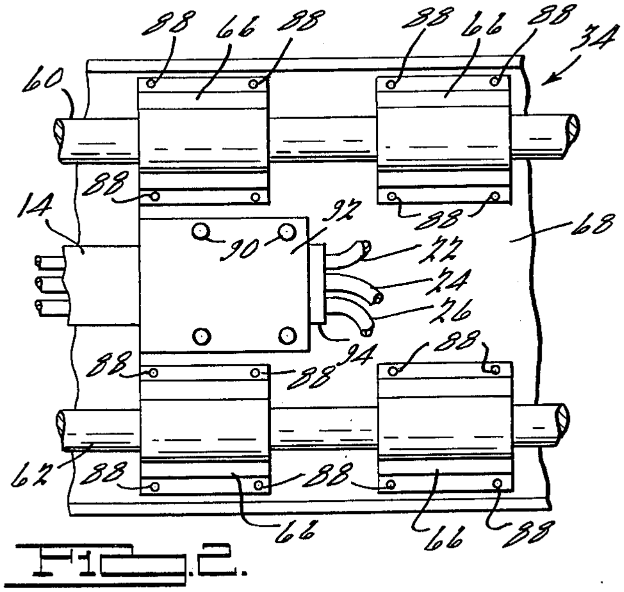
FIG. 2.
FIG. 3.
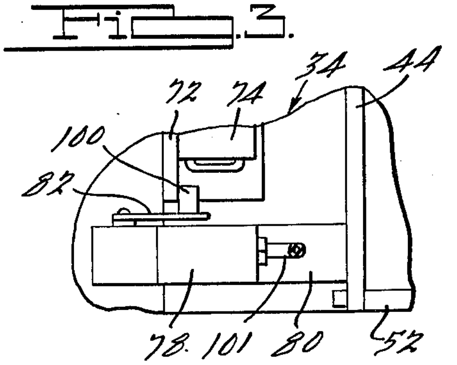

RECIPROCATOR DEVICE

BACKGROUND OF THE INVENTION

This invention relates generally to apparatus for cleaning and lubricating the working surfaces of various forming devices and more particularly to such automatic reciprocating devices which are adapted to pass between the open opposed working surfaces of such forming apparatus as dies, molds, or other similar apparatus, and spray such surfaces with air or other desired fluids such as lubricating compounds, cooling agents or release agents between operational cycles of such forming apparatus.

In many industrial forming processes, such as, the molding, die-casting, drawing, and forging of various metals or other similar materials, it is necessary to apply a lubricant to the working surfaces of such dies or other forming apparatus between machine-cycle operations. Also, it is often desirable to blow air across these working surfaces to remove scale, sediment or other impurities which may have remained adhered thereto from previous operational cycles. Further, the application of air and lubricant to these working surfaces tends to cool the dies between operational cycles thereby prolonging the life of the dies. In certain cases it may also be desirable to apply a suitable release agent to promote removal of the finished article upon completion of the operational cycle.

Various devices have been developed for automatically applying these lubricants or release agents which also provide means for blowing out the cavities of the die or mold. Generally, all of these devices employ a hydraulic or pneumaticaly actuated piston having a telescoping rod attached thereto which carries a plurality of spray heads. The spray head is moved inward between the opposing faces of the die surfaces so as to enable it to spray these surfaces with any desired combination of fluids. Once actuated, the piston will cause the rod attached thereto to extend thereby causing the attached spray head to travel between the opposed working surfaces of the die or mold and suitable control circuitry times the application of the fluids as well as the withdrawal of the spray head so as to insure that the spray head is completely withdrawn before the closing of the mold. Occasionally, this timing mechanism may malfunction and thereby fail to withdraw the spray head and associated piston rod prior to the closing of the die. This failure results in the crushing of both the spray head and hdyraulic piston rod member by the die or mold members. As the piston and rod members are connected interiorly of the piston housing, the entire piston assembly will generally require replacement. This replacement operation is expensive both in terms of machine down time and parts required for repair as the rod member must be accurately machined in order to afford a close telescopic fit within the piston housing. Further, as the piston is designed to telescope within the piston housing, it is important that the telescoping surfaces of the piston be kept relatively clean. Occasionally, in the cleaning of the working surfaces of the die or mood, debris may be thrwon up on these telescoping surfaces, which may cause the hydraulic piston to jam upon actuation of its retraction cycle. This jamming may also leave the spray head and associated portion of the piston rod between die or mold surfaces as it is closed, resulting in a crushing thereof. In many cases, this crushing of the spray head and associated rod member may result in substantial damage to the working surfaces of the die or mold itself, thus further increasing the costs of repairs required. Further, while it is possible to provide additional sensing and control mechanisms to prevent the die or mold from closing until the spray head has been removed from between the opposed surfaces, such additional control means is often expensive to design, install, and maintain and further provides additional operating mechanisms which are subject to failure, and in any event further increases the overall maintenance costs for the reciprocating device.

Further, the hydraulic or pneumatic piston assemblies require high pressure seals in order to insure against actuating fluid leakage. These seals are subjected to continual wear as well as high temperatures due to the close proximity to the dies or molds, thus requiring periodic replacement in order to prevent a malfunction of the device. This also results in further increasing both operating maintenance costs and machine down time.

The state of the art is shown by the following patents;

| U.S. Patent No. | To | Issued |
|---|---|---|
| 3,482,652 | Stone III | Dec. 9, 1969 |
| 2,929,564 | Stone III | March 22, 1960 |
| 2,344,905 | Short | March 21, 1944 |
| 3,525,382 | Devol | Aug. 25, 1970 |
| 3,522,838 | Ott | Aug. 4, 1970 |
| 2,695,592 | Szczepanski | Nov. 30, 1954 |
| 3,393,658 | Ott | July 23, 1968 |
| 3,544,355 | Ott | Dec. 1, 1970 |
| 954,241 | Affelder and Gorton | April 5, 1910 |
| 3,870,164 | Haase | March 11, 1975 |
| 3,669,592 | Miller | June 13, 1972 |
| German Patent Specification No. | | Issued |
| 1,296,743 | | Jan. 22, 1970 |

and the following publications:
Acheson Technical Brochure, entitled "Dag Swing Arm Reciprocator for automatic spraying of pressure die casting dies".
Rimrock Corp. technical data sheet for Reciprocator Model 001, Model 002, Manifold and Nozzle Assemblies Model 104.
Rimrock Corp. technical report No. 3 entitled "How problem tooling runs more profitably at Kolsters Tool and Die".
G-W Plastics Engineers, Inc., technical bulletin 300R.

Accordingly, it is an object of the present invention to provide a reciprocating device having a spray head carrying member which is adapted to reciprocate between opposed faces of such dies or molds and may be easily and rapidly replaced should such member become damaged by the premature closing of the mold or die.

It is a further objective of the present invention to provide a reciprocating device which may be quickly and inexpensively repaired, should such premature closing of the die members occur, thereby minimizing machine down time.

It is a still further objective of the present invention to provide a reciprocating device which is inexpensive to construct, may be easily maintained, and minimizes the associated control circuitry.

Other objects, features and advantages of the present invention will become apparent from the subsequent description and the appended claims taken in conjunction with the accompanying drawings.

BRIEF DESCRIPTION OF THE DRAWINGS

FIG. 1 is a perspective view of a reciprocating device in accordance with the present invention having a spray head attached thereto and the top and side housing cover portions thereof removed;

FIG. 2 is a bottom view of the carriage assembly of the reciprocating device illustrated in FIG. 1;

FIG. 3 is a top view of a portion of the reciprocating device of FIG. 1 showing the rear limit switch and associated means for actuation thereof;

DETAILED DESCRIPTION OF THE PREFERRED EMBODIMENT

Figure 5:
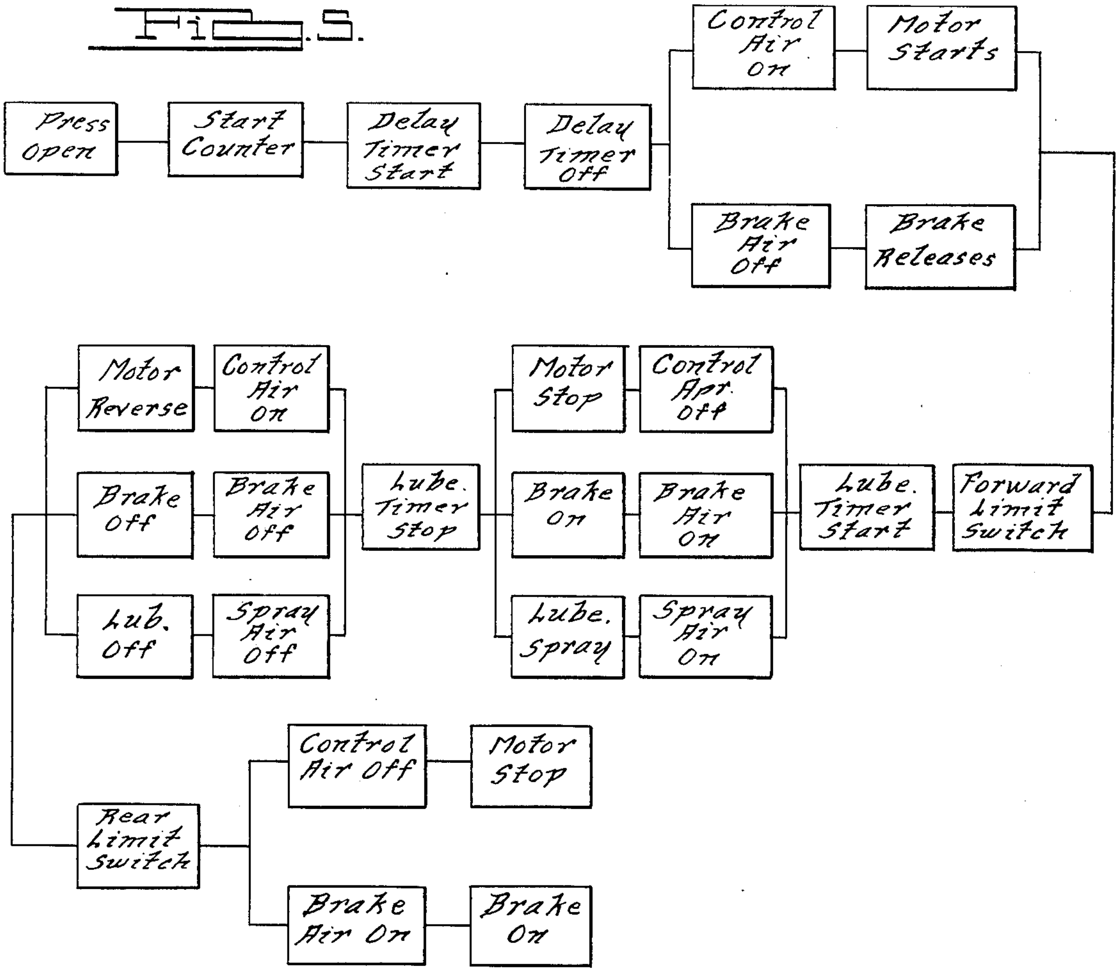
FIG. 5 is a block diagram showing the operational sequence of the reciprocating device.

Referring now to FIG. 1, there is shown therein a reciprocating device indicated generally at 10 having a housing 12 with an extension tube 14 extending outwardly from an end wall 16 and having a spray head assembly 18 secured to a terminal end portion of extension tube 14. Spray head assembly 18 is comprised of a main body manifold portion 20 having means for connection of air hoses 22 and 24, lubricant supply hoses 26, and the like, provided thereon in such a manner as to allow the hoses to feed directly into the main body manifold portion 20 of the spray head assembly 18 at the point of attachment with the extension tube member 14. The main body manifold portion 20 of the spray head assembly 18 has a plurality of the passage ways provided therein which communicate with a plurality of nozzles 28 and 30 which are attached thereto. Spray head assembly 18 as illustrated in FIG. 1 has provided thereon both scale blow nozzles 28 and lubricant spray nozzles 30. It should be noted, however, that this spray head assembly is illustrative only and a wide variety of spray head arrangements having additional nozzles arranged in any desired configuration may be substituted therefore. These nozzles portions will be arranged in a suitable pattern so as to insure complete coverage of the die or mold working surfaces as the extension arm causes the spray head to travel between these opposed die and mold working surfaces. Also, should it be desirable to coat the working surfaces of the die or mold with a suitable release agent or other fluid, a third group of nozzles may be easily incorporated into the manifold 20, suitable passage ways provided therein along with additional connection points for supply hoses to feed the release agent or other fluid to the spray head manifold 20. Spray head assembly 18 may be secured to the end portion of extension tube 14 in any suitable manner, such as through the agency of bolts or set screws or by any other desired suitable fastening means.

Extension tube 14 extends rearwardly from the spray head assembly 18 and generally perpendicular thereto, through an aperture 32 provided in end wall 16 of the reciprocating device housing 12 to a carriage assembly 34 to which it is removably secured as described in greater detail below. Aperture 32 provided in end wall portion 16 of the housing 14 has a suitable dust sealing means 36 provided therein which surrounds extension tube 14 and serves to prevent dirt or other contaminants from entering housing 12 so as to insure such contaminants will not jam or otherwise cause increased wear interiorly thereof.

Disposed interiorally of housing 12 is a worm screw drive shaft 38 extending longitudinally therein. The forward end of worm screw drive shaft 38 is secured to the interior surface 40 of the end wall 16 through the agency of a bearing means 42 so as to allow said worm screw drive shaft to rotate with respect to wall 16. The opposite end of worm screw drive shaft 38 extends through a support member 44 projecting outward from an end wall portion 46 of the housing 14 and is coupled to the driving shaft of a motor 48 which is secured to end wall 46 of the housing 14. Support member 44 is supported from end wall 46 by a pair of parallel spaced apart rearwardly extending side members 50 and 52 and has a bearing means 54 provided therein for rotatably supporting the worm screw drive shaft 38 as it passes therethrough. An annular disc 56 is fixedly secured to worm screw drive shaft 38 between support member 44 and rear end wall 46. A disc brake caliper 58 surrounds and is adapted to engage a portion of annular disc 56 and is secured interiorly of housing 12 between support member 44 and end wall 46 through the agency of rods extending therebetween so as to allow a slight lateral motion therebetween. Caliper 58 and disc 56 cooperate to provide means by which the worm screw drive shaft may be secured in position so as to prevent rotation thereof when the brake is in an on position.

In an operational prototype of the present invention a variable speed reversible pneumatic motor was utilized with excellent results. It should be noted, however, that any other suitable motor may be easily substitutued therefore. Generally it will be desirable to utilize motors having a reversing capability as well as the ability to operate at varying speeds. However, should it be desirable to employ a non-reversible motor, a suitable transmission may be provided between the motor and worm screw drive shaft to provide this capability.

A pair of substantially parallel longitudinally extending spaced apart ball bushing shafts 60 and 62 are disposed interiorally of housing 14 and extend between the forward and rear end wall portions 16 and 46 respectively of the housing 14. Ball bushing shafts 60 and 62 are secured in position by bolts 64 extending through the respective end wall portions 16 and 46 or may alternatedly be welded in place or secured in position by any other suitable means. Carriage assembly 34 has a plurality of linear motion ball bushings 66 secured to a generally rectangular shaped plateform portion 68. Each of the ball bushings 66 has a longitudinally extending aperture 70 extending therethrough, through which shafts 60 and 62 extend so as to secure carriage assembly 34 thereto and allow plateform 68 to be freely movable along the length of shafts 60 and 62. In the particular embodiment shown herein, there are four such linear ball bushings 66, two of which engage each of ball baushings shafts 60 and 62 respectively. Plateform 68 has an angled member 71 having upward projecting member 72 secured to its upper surface to which a ball nut 74 is fixedly secured. Ball nut 74 is adapted to engage worm screw drive shaft 38 so as to be caused to travel therealong in response to rotation thereof. As ball nut 74 is fixedly secured to plateform 68, it will cause plateform 68 to be advance or retracted in response to rotation of worm screw drive shaft 38. Angled member 71 may be secured to plateform 68 by a plurality of bolts 76 or any other suitable means.

A rear limit switch 78 is mounted upon a support member 80 projecting forwardly from support member 44 and has an actuating arm 82 which engages and is operated by upward projecting member 72 as described in greater detail below.

A forward limit 84 switch is also mounted interiorly of housing 13 being secured to surface 40 of end wall portion 16. Carriage assembly 34 has provided thereon an adjustable actuating mechanism indicated generally at 86 for operating forward limit switch 84 as is described and illustrated in greater detail with reference to FIG. 4.

Referring now to FIG. 2, there is shown therein a bottom view of carriage assembly 34 of FIG. 1. As previously mentioned, plateform 68 has fixedly secured thereto four linear motion ball bushing members 66 through the agency of plurality of bolts 88 and having shafts 60 and 62 extending therethrough. These linear motion ball bushings cooperate with shafts 60 and 62 to allow carriage assembly 34 to ravel freely therealong between end wall portions 16 and 46. An end portion of extension tube 14 is secured to the lower surface of plateform 68 between linear motion ball bushings 66 by a plurality of bolts 90 passing through a clamping member 92 in such a manner as to clamp the extension tube between the clamping member 92 and the plateform 68. Extension tube 14 may be of any cross-sectional shape desired, and is hollow so as to provide a passageway through which the various air, lubricant, or other fluid supply tubes 22, 24 and 26 may be extended and coupled to the spray head manifold 20 as previously described. Supply tubes 22, 24 and 26 extend interiorally along extension tube 14 and are brought out the end portion 94 of the extension tube 14 and extend forward within the reciprocating device housing 12 and are connected to fittings 96 extending through a side wall portion 98 adjacent the end wall portion 16 of housing 14 as best seen with reference to FIG. 1. Thus, as is readily apparent, as extention 14 is extended out of housing 12 by the movement of carriage assembly 34 in response to the rotation of worm screw drive shaft 38 supply tubes 22, 24 and 26 will also move forward. Any suitable fittings may be provided on side wall 96 and will be adapted to allow connection of external supply lines running from fluid reservoirs or other conventional supply means. The side walls, e.g. bottom wall member 98, may suitably have one or more access doors positioned therein to provide access to the interior of the reciprocator device.

Referring now to FIG. 3, in which rear limit switch 78 is shown in operative relationship to a portion of carriage assembly 34. As previously mentioned rear limit switch 78 is mounted on a forward extending member 80 secured to support member 44 so as to allow carriage assembly 34 to pass below and extends forward a sufficient distance such as to allow a portion 100 of actuating arm 82 to engage a portion of upward projecting member 72. Thus, as a carriage assembly 34 is caused to travel backward by the rotation of the worm screw drive shaft 38 upward projecting member 72 will engage portion 100 of actuating arm 82 provided on limit switch 78 thereby causing the limit switch to be actuated. Limit switch 78 has a line 101 connected thereto for transmitting a signal in response to actuation by carriage assembly 34 to remote control means.

Figure 4:
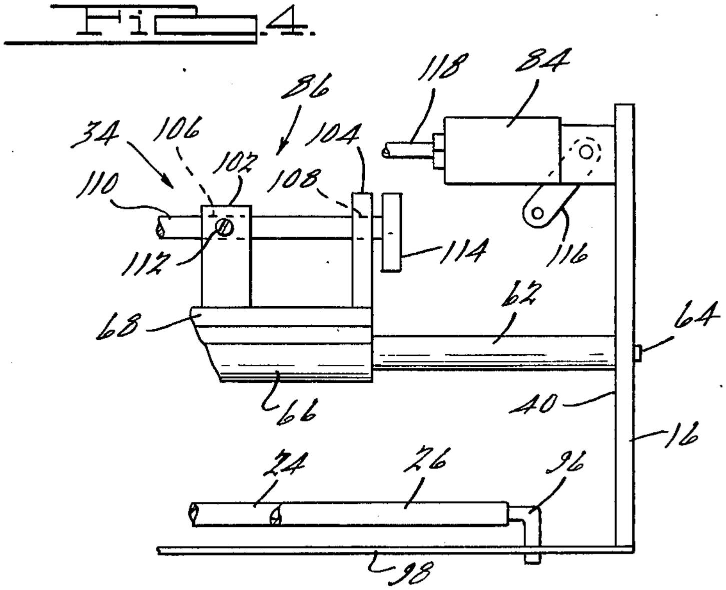
FIG. 4 is a side view of a portion of the reciprocating device of FIG. 1, illustrating the forward limit switch and associated actuation mechanisms.

Referring now to FIG. 4, there is illustrated therein a portion of carriage assembly 34 on which is mounted forward limit switch actuating mechanism 86 which is shown in operative relationship to forward end wall portion 16 of the housing assembly 14. Limit switch actuating mechanism 86 comprises a pair of upward projecting support members 102 and 104 having apertures 106 and 108 provided therein through which an actuating shaft 110 extends. Actuating shaft 110 is movable with respect to support member 102 and 104 so as to allow adjustment of the position of carriage assembly 34 at which limit switch 84 will be actuated. Rear support member 102 has a set screw 112 provided therein adapted to engage shaft 110 so as to secure shaft 110 in a predetermined position. Disposed at the forward end of shaft 110 is an actuating member 114 which is secured to shaft 110 and is adapted to engage and actuate a lever arm 116 provided on limit switch 84. Thus, as carriage assembly 34 is caused to move forward, actuating member 114 will engage lever arm 116 of limit switch 84 causing the lever arm to rotate in a counter-clockwise direction thereby actuating limit switch 86. Limit switch 86 also has a line 118 connected thereto for transmitting a signal to remote control means in response to actuation by the carriage assembly. Also illustrated in FIG. 4, is an additional supply tube 24 and fitting 96 as previously described.

One specific operational sequence of the reciprocating device of the present invention will now be described with reference to FIG. 5. As the press or other forming apparatus is opened, the moving portion thereof will engage a limit switch mounted in a convenient location thereon. This limit switch will send a signal to a counter advancing it one count which in turn will actuate a delay timer. While the delay timer is running, the operator will remove the finished product from the mold or die. Once the delay timer has timed out, it will send a signal to both a control air solenoid and a brake air solenoid. This signal will cause the control air solenoid to open a control air valve thereby allowing air to pass to an air motor provided on the reciprocating unit. Similarly, the signal to the brake air solenoid will close the brake air valve thereby releasing th air pressure holding the disc brake calipher 58 releasing disc 56 and allowing motor 48 to begin rotating worm screw drive shaft 38. Ball unit 74 will thus be caused to move carriage assembly 34 forward along ball bushing shafts 60 and 62 thereby causing extension tube 14 to be moved out of housing 12 and associated spray head assembly 18 to move forward between the opposing working surfaces of the die or mold. As the forward limit switch actuating member 114 engages the forward limit switch lever arm 116 casuing actuation thereof, a signal will be sent to a lube timer. This lube timer will in turn send a signal to the control air solenoid which will close the control air valve, thus stoppingthe motor. Simultaneously, therewith, the lube timer will also transmit a signal to the brake air solenoid thereby causing the brake air valve to open which in turn will supply air pressure to and actuate the disc brake calipher 58 thus stopping the rotational movement of worm screw drive shaft 38. The lube timer will also simultaneously send a signal to a spray air solenoid which will cause both a spray air valve and a lube valve to open thereby allowing both air and lubricant to flow to the spray head. The spray head will then apply the lubricant to the opposing working surfaces of the die or mold. Once a sufficient amount of lubricant has been applied to the die or mold surfaces, the lube timer will time out which will cause a signal to be transmitted to each of the control air solenoids, the brake air solenoid and the spray air solonoid. This signal will cause the control air solenoid to open the control air valve thus reversing the motor simultaneously with the signal to the brake air solenoid which closes the brake air valve thus releasing the brake. The spray air solonoid will also cause the spray air valve and lube valves to close thereby shutting off the lubricant and spray air supplies. As motor 48 causes the carriage assembly 34 to travel backward along ball bushing shafts 60 and 62 withdrawing the extension tube 14, upward projecting member 72 will engage member 100 of rear limit switch actuating arm 82 thereby actuating rear limit switch 78. Limit switch 78 will then transmit a signal to both the control air solenoid and brake air solenoid which will respectively close a control air valve thus stopping the motor and simultaneously therewith, open a brake air valve thereby applying the brake to retain the reciprocating device in a retracted position.

The particular operational sequence described above is designed to spray lubricant only on the working surfaces of the die or mold while the reciprocating device is in a fully extended position. As is readily apparent, this operational cycle may be easily and readily varied so to accomplish a wide variety of operational sequences such as for example, to cause blow air to be sprayed across the working surfaces of the die or mold as the reciprocating extension tube travels outwardly, to spray lubricant while the extension tube is in an extended position and to dry the working surfaces of the mold as the extension tube is caused to retract. Similarly, should it be desirable, the reciprocating device may be set up to provide repetitive cycles, such as, for example, to make one pass over the opposing working surfaces of the die or mold while in a scale blow operating mode, to make another pass over the working surfaces of the die or mold spraying a coolant or lubricant upon the working surfaces thereof, and to make a third reciprocation applying merely compressed air to dry the mold surfaces. These operational cycle variations will be adapted to any particular application for which the reciprocating device is designed and the specific requirements such as cooling, lubricant, release agent applications and the like, will be dictated by both the type of die or mold being used as well as the material being used in producing the desired product.

It is readily apparent that as extension tube 14 is clamped to carriage assembly 34 it may be easily and quickly replaced should it become damaged. Further, in that extension tube 14 is not required to telescope into a piston housing, it does not require any special machining to produce a close fit and may be fabricated relatively inexpensively from any suitable pipe or channel stock. Thus, this extension tube will be substantially less expensive should replacement be required as in the case of premature die closure crushing the extension tube. Also, as this extension tube may be replaced quickly and with a minimal amount of disassembly of the device, machine down time will be substantially reduced. Further, as the supply tubes are contained within the extension tube and are brought back and connected to fittings provided on the side wall portion of the reciprocating device housing, the supply tubes may also be readily and easily replaced should they be damaged or otherwise require replacement. The fact that the supply tubes will be of relatively short length, will further minimize the expense incurred should these supply tubes be damaged. The relatively simple drive arrangement also aids in reducing maintenance costs and machine down time as there are no seals to require replacement. Rather only periodic lubrication of the moving parts is required. Additionally, it should be noted that in certain applications it may be desirable to provide a sealed enclosure for the carriage assembly and associated driving mechanism which may be easily accomplished in a conventional manner. Such an enclosure will even further reduce maintenance and repair costs as the moving parts will be protected from dust, grit and other wear producing contaminents carried by the atmosphere.

While it will be apparent that the preferred embodiment of the invention disclosed is well calculated to fullfill the objects above stated, it will be appreciated that the invention is susceptible to modification, variation and change without departing from the proper scope or fair meaning of the subjoined claim.

We claim:

1. A reciprocating device adapted to longitudinally reciprocate a spray head across a surface comprising:

a supporting structure;

a reversible driving means having a driving shaft extending outward therefrom adapted to be rotationally driven by said driving means, said driving means being secured to said supporting structure;

a carriage assembly;

an elongated member having one end thereof removably secured to said carriage assembly;

means connecting said carriage assembly to said driving shaft so as to cause said carriage assembly and said elongated member to be lineally reciprocated in a longitudinal direction in response to said rotation of said driving shaft;

spray head means secured to another end of said elongated member; and, feed line means secured to said spray head means for supplying fluids to said spray head means from a supply source.

2. A reciprocating device as set forth in claim 1 further comprising brake means mounted on said supporting structure and associated with said driving shaft for selectively engaging a portion of said driving shaft when in an on position so as to prevent rotation thereof.

3. A reciprocating device as set forth in claim 2 wherein said brake means is a disc brake caliper said driving shaft having a radially outwardly extending annular disc, nonrotatably secured thereto and adapted to be engaged by said disc brake caliper.

4. A reciprocating device as set forth in claim 1 wherein said elongated member is hollow, said feed line means includes a plurality of feed tubes extending interiorly of said elongated member to said spray head means and having one end connected thereto.

5. A reciprocating device as set forth in claim 4 wherein said feed line means further includes a plurality of fittings secured to said support structure; another end of each of said feed tubes being removably secured to one end of each of said plurality of fittings, each of said plurality of fittings having another end extending externally from said supporting structure and further having a fluid supply line connected thereto.

6. A reciprocating device as set forth in claim 1 wherein said means connecting said carriage assembly to said driving shaft comprises:

an elongated threaded shaft connected to said driving shaft and adapted to be rotated by said driving shaft;

a driven member secured to said carriage assembly having a threaded aperture extending therethrough, said elongated threaded shaft being rotatably disposed within said aperture, said driven member and said elongated threaded shaft cooperating to lineally reciprocate said carriage assembly in response to rotation of said elongated threaded shaft.

7. A reciprocating device as set forth in claim 6 wherein said supporting structure further comprises:
- a first and second end portions;
- interconnecting side portions, said driving means being secured to said first end portion, one end of said threaded shaft being rotatably secured to said second end portion; and,
- a pair of elongated parallel spaced apart guide members extending between and secured to said first and second end portions, said carriage assembly being movably supported on said guide members.

8. A reciprocating device as set forth in claim 7 wherein said carriage assembly is movably supported on said guide members through the agency of a plurality of bushing members secured to said carriage assembly, said bushing members having apertures through which said guide members extend.

9. A reciprocating device as set forth in claim 7 wherein said bushing members having linear motion ball bushings engaging said guide members disposed in said apertures.

10. A reciprocating device as set forth in claim 7 wherein said interconnecting side portions are wall members which cooperate with said first and second end portions to form a sealed enclosure.

11. A reciprocating device as set forth in claim 10 wherein said second end portion has an aperture provided therein, said elongated member extending through said aperture; said end portion further having a dust sealing means provided thereon adjacent said aperture said dust sealing means engaging said elongated member so as to prevent contaminants from passing through said aperture.

12. A reciprocating device as set forth in claim 1 wherein said reversible driving means is a variable speed reversible motor, said device further comprising:
- a first control means secured to said supporting structure and adapted to be actuated in response to said carriage assembly's movement into a first predetermined position;
- a second control means secured to said supporting structure and adapted to be actuated in response to the movement of said carriage assembly into a second predetermined position; and,
- said first and second control means being further adapted to control the operating mode of said motor in response to the actuations thereof.

13. A reciprocating device as set forth in claim 12 wherein said first and second control means include first and second limit switches.

14. A reciprocating device as set forth in claim 13 wherein said carriage assembly includes means secured thereto adapted to engage said actuate said second limit switch, said actuating means being adjustable so as to allow said second predetermined position to be varied.

15. A reciprocating device as set forth in claim 14 wherein said actuating means comprise:
- a pair of spaced apart upward extending support members secured to said carriage assembly, each of said support members having an aperture extending therethrough;
- an actuating shaft extending through each of said apertures and axially movable with respect to said support members; and,
- said shaft means provided on one of said support members for securing in a predetermined position.

16. A reciprocating device adapted to reciprocate a spray head across a surface comprising:
- a housing having a fist and second end portions and a plurality of side wall portions extending between said end portions;
- a variable speed reversible drive means secured to said first end portion, said drive means having a driving shaft extending interiorly of said housing and adapted to be rotationally driven by said drive means;
- an elongated threaded shaft having one end connected to said driving shaft so as to be rotated by said driving shaft said threaded shaft extending to and rotatably secured to said second end portion;
- a pair of elongated spaced apart substantially parallel guide members extending between and secured to said first and second end portions;
- a carriage assembly secured to said guide members in such a manner as to be movable therealong between said first and second end portions;
- coupling means fixedly secured to said carriage assembly and adapted to cooperate with said threaded shaft so as to cause said carriage assembly to travel along said guide members in response to the rotation of said driving shaft;
- an elongated member having one end secured to said carriage assembly, said elongated member extending through an aperture provided in said second end portion;
- a spray head secured to another end of said elongated member, said spray head having a plurality of spray nozzles secured thereto adapted to spray fluids;
- fluid feed lines connected to said spray head for feeding said fluids from a reservoir to said spray head;
- means for controlling the flow of said fluids; and,
- control means for selectively actuating said driving means and said fluid flow control.

17. A reciprocating device as set forth in claim 16 further comprising:
- brake means secured to said housing and adapted to engage a portion of said threaded shaft so as to prevent rotation of said threaded shaft when said driving means is in an off position; and,
- control means for selectively switching said brake means between an on position in which said brake means engages a portion of said threaded shaft and an off position in which said brake means releases said threaded shaft.

18. A reciprocating device as set forth in claim 17 wherein said brake means comprises:
- a pneumatically actuated disc brake caliper and said elongated threaded shaft has an annular, radially extending disc nonrotatably secured to said threaded shaft and adapted to be engaged by said disc brake caliper.

19. A reciprocating device as set forth in claim 17 wherein said elongated member is hollow, said feed line means include a plurality of feed tubes extending interiorly of said elongated member to said spray head means and having one end connected thereto.

20. A reciprocating device as set forth in claim 19 wherein said fluid feed lines include a plurality of fittings secured to and extending through one of said side wall portions adjacent said second end portion, another end of each of said fluid feed lines being removably secured to one end of each of said plurality of fittings, each of said plurality of fitting having another end extending externally from said housing and further having a fluid supply line connected thereto.

21. A reciprocating device as set forth in claim 19 wherein said carriage assembly is movably supported on said guide members through the agency of a plurality of bushing members secured to said carriage assembly, said bushing members having apertures through which said guide members extend.

22. A reciprocating device as set forth in claim 21 wherein said bushing members have linear motion ball bushings engaging said guide members disposed in said apertures.

23. A reciprocating device as set forth in claim 22 wherein said second end portion has a dust seal provided thereon and surrounding said elongated member said dust seal being adapted to seal said aperture against entry of contaminants into said housing.

24. A reciprocating device as set forth in claim 23 wherein said control means comprises;

a first control means secured to said supporting structure and adapted to be actuated in response to said carriage assembly's movement into a first predetermined position;

a second control means secured to said supporting structure and adapted to be actuated in response to the movement of said carriage assembly into a second predetermined position; and, said first and second control means being further adapted to control the operating mode of said motor in response to the actuations thereof.

25. A reciprocating device as set forth in claim 24 wherein said first and second control means include first and second limit switches.

26. A reciprocating device as set forth in claim 25 wherein said carriage assembly includes means secured thereto adapted to engage and actuate said second limit switch, said actuating means being adjustable so as to allow said second predetermined position to be varied.

27. A reciprocating device as set forth in claim 26 wherein said actuating means comprise:

a pair of spaced apart upward extending support members secured to said carriage assembly, each of said support members having an aperture extending therethrough;

an actuating shaft extending through each of said apertures and axially movable with respect to said support members; and, said shaft means provided on one of said support members for securing in a predetermined position.

28. A reciprocating device for reciprocating a spray head across a surface comprising:

a housing having a first and second end portions and a plurality of side wall portions, extending between and connecting said end portions;

a reversible motor mounted on said first end portion and having a driving shaft extending therefrom interiorly of said housing;

a worm screw drive shaft having one end coupled to said driving shaft and another end rotatably secured to said second end portion;

anti-friction bearing means disposed between said second end portion and said worm screw drive shaft;

a pair of elongated spaced apart parallel guide members extending between said first and second end portions;

a plateform member;

linear motion anti-friction bushing means secured to said plateform and having apertures therein through which said guide members extend so as to movably secure said plateform to said guide members;

a ball nut disposed on said worm screw drive shaft and fixedly secured to plateform so as to cause said plateform to move lineally along said guide members in response to rotation of said worm screw drive shaft;

a hollow elongated member having one end removably secured to said plateform and extending through an aperture provided in said second end portion;

a spray head secured to another end of said elongated member;

a dust seal disposed in said aperture so as to seal said end wall portion and said elongated member against entry of dust into said housing;

an annular disc secured to said worm screw drive shaft adjacent said one end;

a disc brake caliper secured to said housing and surrounding said annular disc, said caliper being adapted to relesably engage said disc to prevent rotation of said worm screw drive shaft when in an on position;

a first limit switch adapted to be actuated by said plateform when said plateform is adjacent said first end portion, said limit switch being further adapted to stop said motor and turn said disc brake caliper on in response to said actuation;

a second limit switch adapted to be actuated by said plateform when said plateform is adjacent said second end portion, said second limit switch being further adapted to stop said motor and turn said disc brake caliper on in response to said actuation;

a plurality of fluid supply tubes connected to said spray head and extending axially interiorly of said elongated member into said housing; and, supply tube fittings provided on one of said side wall portions adjacent said second end portion and extending therethrough, said fluid supply tubes being connected thereto.

* * * * *

UNITED STATES PATENT AND TRADEMARK OFFICE

CERTIFICATE OF CORRECTION

PATENT NO. : 4,041,899

DATED : August 16, 1977

INVENTOR(S) : Eugene Earl Wolfe and Allan Burkett Heath

It is certified that error appears in the above-identified patent and that said Letters Patent are hereby corrected as shown below:

Column 1, line 34, the word "pneumaticaly" should be -- pneumatically --;
Column 1, line 50, the word "hdyraulic" should be -- hydraulic --;
Column 1, line 62, the word "mood" should be -- mold --;
Column 1, line 62, the word "thrwon" should be -- thrown --;
Column 4, line 55, the word "baushing" should be -- bushing --;
Column 5, line 17, the word "ravel" should be -- travel --;
Column 6, line 38, the word "th" should be -- the --;
Column 6, line 47, the word "casuing" should be -- causing --;
Column 9, line 55, after the word "engage", delete the word "said" and insert instead thereof the word -- and --;
Column 10, line 3 (Cl. 10, line 3), the word "fist" should be -- first --.

Signed and Sealed this

*Twenty-fourth* Day of *January 1978*

[SEAL]

*Attest:*

RUTH C. MASON
*Attesting Officer*

LUTRELLE F. PARKER
*Acting Commissioner of Patents and Trademarks*